United States Patent [19]
von Wedel

[11] Patent Number: 4,457,081
[45] Date of Patent: Jul. 3, 1984

[54] COOLING PROCESS FOR MATERIAL BEDS OF BULK MATERIALS

[76] Inventor: Karl von Wedel, Amselstrasse 5, 3057 Neustadt 1, Fed. Rep. of Germany

[21] Appl. No.: 406,184

[22] Filed: Aug. 9, 1982

[30] Foreign Application Priority Data

Aug. 8, 1981 [DE] Fed. Rep. of Germany ....... 3131514

[51] Int. Cl.³ .......................... F26B 7/00; F27D 15/02
[52] U.S. Cl. ........................................... 34/20; 432/77
[58] Field of Search ................... 34/20, 57 R; 432/77, 432/78

[56] References Cited

U.S. PATENT DOCUMENTS

| | | | |
|---|---|---|---|
| 3,079,701 | 3/1963 | Helming et al. | 34/20 |
| 3,155,378 | 11/1964 | Berg et al. | 432/77 |
| 3,539,164 | 11/1970 | Brachthauser | 34/20 |

FOREIGN PATENT DOCUMENTS 1335307 10/1973 United Kingdom .................... 34/20

*Primary Examiner*—John J. Camby
*Attorney, Agent, or Firm*—Edward F. Levy

[57] ABSTRACT

In a cooling process for material beds of bulk materials like cement clinker taking place on grate coolers increased bed depths and increased air velocities are provided by decelerating an upper layer of the material bed, which may be a fluidized bed of a fine fraction of the bulk material, with respect to the bottom layer or fixed bed of the material bed in order to obtain a material discharge of uniform temperature. For the purpose of such deceleration an adjustable stop wall is provided leaving an adjustable passage towards the grate for the material. The stop wall includes a thrust limit detector to allow for a crushing or passing of any chunks. Hot dribblings may be pneumatically recycled onto the top of the material bed by means of the increased air pressure.

17 Claims, 2 Drawing Figures

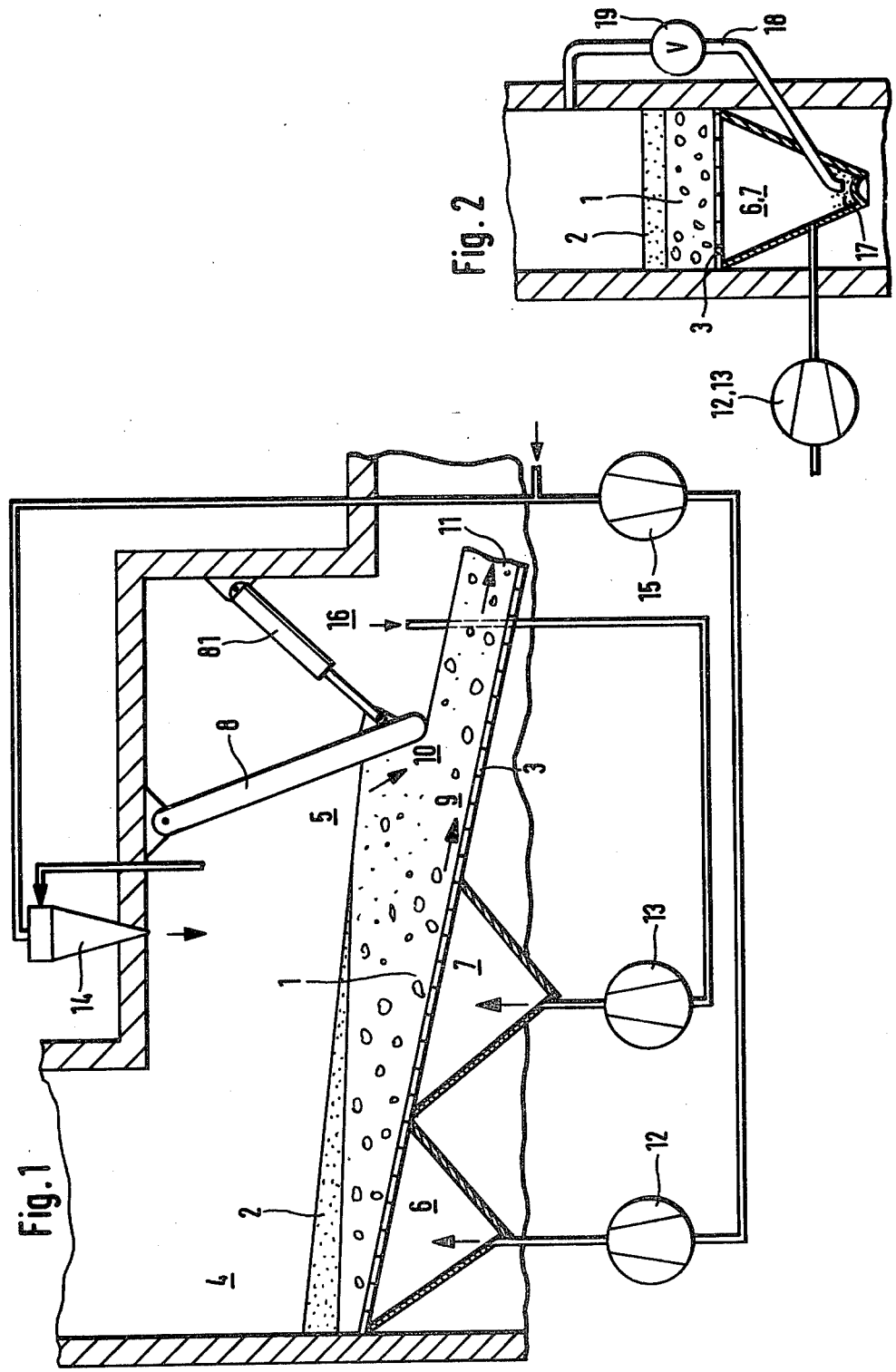

COOLING PROCESS FOR MATERIAL BEDS OF BULK MATERIALS

BACKGROUND OF THE INVENTION

1. Field of the Invention

The invention refers to a process of cooling a material bed of bulk material such as cement clinker on grate coolers, with a cooling medium such as air being passed through the material bed in an upward direction, and also to a decelerating device for carrying out such a cooling process.

2. Description of Prior Art

In cement production as well as in other rotary kiln processes for burning lime, magnesite, iron ore, phosphate or the like, the material is fed to a cooler upon reaching its process temperature for direct preheating of the combustion air. Attainable degrees of heat recuperation by means of the combustion air depend on the mass flow rates, specific calorific values, and the efficiency of the heat exchange.

In modern cement plants, due to fuel savings, only 0.8 to 0.9 nm$^3$ of combustion air per kg of cement clinker are available for cooling. Yet the recuperation could theoretically still be 100%. In practice, however, most cooler types attain only about 70% recuperation. With grate coolers the residual heat may be wasted with great quantities of off-gas. Occasionally it is partially used indirectly for the cement process. An increase of 10% the recuperation would effect a heat saving of 5% in the cement process.

The recuperation is mainly limited by the uneven size distribution of the cement clinker as well as by the different efficiencies of heat exchange of the different cooler types for the coarse and the fine clinker fractions, respectively.

The rotary kiln and satellite cooler types apply the counter flow principle. They are well suited for the fines, which are evenly exposed to the air stream in screens. The air velocities permissible for the fines are too small to sufficiently cool the coarse fraction, which in addition is passing rotary kilns faster than fines. Furthermore, coarse chunks disturb the even air distribution to the satellite tubes.

A known shaft kiln—see e.g. DE-PS No. 15 58 609—also applies the counter flow principle and cools the coarse material sufficiently when the air flow and retention time are chosen appropriately. However, the fines collect an concentrate in a fluidized bed or in so-called dead corners and are discharged irregularly upon the collapse of the air flow and consequently not cooled sufficiently.

In grate coolers the cross flow principle is applied sacrificing the counter flow for better air distribution to the coarse and the fine material. The cross flow may pass the bed one or more times in counter flow sense. The improved air distribution is achieved by increasing the surface of the grate in connection with thin beds of less than 0.5 m, and air flows forced towards each grate section by partition walls forming separate air compartments beneath the grate. Following observation of the air distribution during operation single grate plates can be made impermeable or motionless to even out air and material distribution. Thus, in cross flow grates the coarse and the fine material are cooled in a like manner, and in practice one may therefore attain the same degree of recuperation by means of counter flow coolers.

Attempts were made to increase the bed depth with the same air velocity by higher pressure increasing the retention time, but they resulted in less recuperation, which can be explained by worse air distribution and local fines collection effected by less stirring of the bed by less grate action.

Other attempts were made increasing the air velocity, which resulted in uncontrollable movements of the fines (red river. Thus, with uneven size distributions, bed depths are not above 0.5 m and air velocities are kept below fluidizing the fines.

As a consequence of the different suitability of the coolers for the coarse and the fine material, solutions were proposed providing a separation of the coarse and the fine material and their separate cooling.

It is known (see DE-AS No. 23 43 339) to separate the fines in the hot feeder zone of a grate cooler by high air velocities and—possibly aided by laterally sloping grates—to discharge the fines to the sides. Thus, it is possible to cool the coarse material on the grate and the fines in additional transverse fluidizing coolers.

According to another known process (DE-AS No. 23 07 165) the separation of the coarse and the fine material is performed at an upper cooling level formed by a grid or screen carrying the coarse fraction, while the fines are cooled by the same air flow in a fluidized bed thereunder.

Neither of these two proposals are known to have been realized. This may be because of the substantial requirement of equipment in connection with the unpredictability of the size distribution, which is familiar to someone skilled in the art, and which makes the size of the separate cooling systems unpredictable as well.

3. Objects of the Invention

It is therefore an object of the invention to improve the heat recuperation of grate coolers.

In this connection, it is another object of the invention to increase the bed depth, thus providing a longer passage of the combustion air to be preheated in order to increase the temperature but without discharging the still hot upper layers of the material bed at the same time as the well cooled bottom layers.

It is yet another object of the invention to improve the heat recuperation of grate coolers increasing the air velocity, and to control the movement of the fine fraction, which is uncontrolled according to present observations, in order to obtain suitable retention times of the coarse and the fine material respectively in the same cooler.

According to a still further object of the invention it is designed to recuperate the heat from the hot fines, generally passing through the grate.

BRIEF SUMMARY OF THE INVENTION

To achieve these objects the invention provides a deceleration of the upper layer of the material bed to be cooled at the cold discharge end of the cooler in a way that a fixed bed will continue to be conveyed by means of the grate action but that an upper layer, which may be a fluidized bed, will be conveyed independently. This process can be carried out advantageously by means of a decelerating device comprising a stop wall above the region of the cold discharge end of the grate extending between the lateral cooler walls, leaving a passage for the discharge of the material bed above the grate.

The invention expediently further provides pipes between the compartment hoppers of the cooling air and the lateral walls of the grate to recycle hot dribblings onto the material bed.

The following essential advantages may be attained by the invention:

1. With great bed depths there is a substantial temperature increase from the bottom towards the upper layers of a material bed. Decelerating the upper layer allow the discharge of material of uniform temperature.

2. The fine and the coarse fraction of the material to be cooled form one bed passed by the same updraught of the cooling gas but may have continuously alternating mass ratios.

3. The fine and the coarse fractions are conveyed almost independently of each other and are jointly discharged at the end of the cooler, where their lowest temperature is expected. Thus, favourite retention times of the coarse and the fine fractions, respectively, are achieved, while sufficiently cooled material can be discharged immediately to avoid unnecessary pressure drops.

4. The cooling of the coarse fraction is effected at high temperature gradients corresponding to its greater cooling demand with respect to the fine fraction. This may result in thermal tensions and assist comminution, and it will allow for frequent grate action.

5. As a result of higher air velocity and improved air distribution, preheated air may already be applied in the first air compartment under the hot feed end of the cooler without any danger of temperature damage to the grate plates.

6. High air velocities will set off the grate area and off-gas treatment facilities.

7. High air velocity will let less dribblings pass through the grate. Their removal from the pressurised compartments by penumatic recycling by means of the cooling medium recuperates their heat as well.

In order to use the improved air distribution achieved by high velocity, a substantial increase of bed depth may advantageously be provided. As outlined, normal coolers have bed depths of not more than 0.5 m on average. The substantial increase, e.g. a doubling of the bed depth, corresponds to a temperature increase of the combustion air. Thus, the grate cooler will come closer to the shaft cooler and to its counter flow principle.

In order to further improve the air distribution within the material to be cooled, the grate bed comprising the fixed and the fluidized bed may expediently increase in depth from the hot feed end towards the cold discharge end, whereas the fluidized bed may decrease in said direction. Hot material is more resistant to air passage than cold material. This effect assists the air distribution along the grate, when the bed depth is increased as cooling progresses. Furthermore, a fluidized bed has a homogenous material and temperature distribution adverse to the counter flow principle. Therefore, the air velocity may be further decreased along the grate, decreasing the fluidizing bed depth. It should be noted that normal grates have bed depths decreasing towards the discharge.

An especially simple manner of obtaining the separate transportation of the fixed and the fluidized bed is to convey by gravity along a sloped surface. Said slope will continuously be altered by changing the discharge rates. This solution allows for a very simple design of the decelerating device. However, the conveyance of the fluidized bed may also be effected by a mechanical device, e.g. a scraper working from the top of the fluidized bed.

According to another preferred embodiment of the invention, separate temperatures of the fixed and the fluidized bed may be taken, and the conveying rates of the fixed and the fluidized bed, respectively, may be controlled by these temperatures. Preferably, one will look for equally good cooling of both material flows.

To carry out the process according to the present invention a deceleration device is provided, preferably by arranging a stop wall above the cold discharge end of the grate bed, extending between the lateral cooler walls, leaving a passage for the material towards the grate. In this way, the fine fraction especially will be decelerated, whereas the coarse material will remain essentially uninfluenced.

Said passage for the material between the grate and the stop wall may preferably be adjustable, e.g. in that the stop wall may be raised and lowered by being guided in lateral guide rails. By this action the flow rate of the fines may be controlled in a rather simple manner and within broad limits. Hydraulic cylinders can be provided. During operation of rotary kilns, occasionally great chunks of the kiln coating which may be greater than the passage adjusted for that moment must be expected. To this end, the hydraulic system may comprise a limit switch corresponding to the hydraulic pressure raised above normal in order to effect a brief lift of the stop wall to enable the free passage of chunks, and thereafter its automatic lowering. Should the grate and the stop wall be of appropriate and heavy design comminution of the chunks may be obtained thereby.

For safeguarding a continuous flow of the fines along the sloped surface the stop wall may be expediently inclined towards the discharge of the grate. This arrangement also favours the installation of hydraulic cylinders.

In case of wide coolers the stop wall may advantageously comprise several independently moveable partitions along the width of the grate bed. Different size distributions along the width of the bed will thus be counteracted.

BRIEF DESCRIPTION OF THE DRAWINGS

Other and further objects of the present invention will be apparent from the following description and claims and are illustrated in the accompanying schematic drawings, which, by way of illustration, show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In these drawings

FIG. 1 shows a longitudinal sectional view of a grate cooler for realizing the process proposed by the present invention, and FIG. 2 shows a cross-sectional view of a grate cooler according to another embodiment of the invention and including an air compartment below the grate and a pneumatic recycling device for the fines.

DETAILED DESCRIPTION OF THE PREFERRED EMBODIMENTS

A grate bed consisting of a fixed bed 1 of coarse material and a fluidized bed 2 of fines is transported by means of an inclined grate 3 from a feed end 4 of a rotary kiln towards a discharge end 5. A stop wall 8, working from above on the beds 1, 2 decelerates the bed material. By means of the stop wall 8 an average bed depth of 1 m is achieved. The portion of the transport flow effected by the grate is designated 9, while the flow controlled by the stop wall 8 is designated 10. Both said flows combine to form the total flow rate 11, which controls the bed depth. The air needed for cooling and fluidization is provided by multistage fans 12, 13 via air compartments 6, 7 at a pressure of about 1000 mm WG, whereas the pressure can be varied according to the momentary size distribution.

The increased bed depth towards the discharge end 5 results mainly from the inclination of the grate 3, which will be determined to charge both compartments 6, 7 with the same mean pressure, whereas the air velocity decreases with an increasing bed depth, and whereas the air temperature decreases with progressive cooling, so that both effects decrease the fluidized bed depth.

The fluidized bed is conveyed by gravity along the surface slope. Close to the stop wall 8 the material reposes and settles on the fixed bed 1, so that it can be discharged according to the adjustment of the passage as part of the total flow 11. The adjustment of the passage and the respective stop wall 8 is effected by hydraulic cylinders 81. They comprise a thrust limit detector regulating a hydraulic pressure above normal to crush or to let any chunks pass.

It can be realised from FIG. 1 that the coarse material is exposed to relatively cold air and will be cooled and discharged faster, while the cooling air preheated by the coarse material takes longer to cool the fines, which hence stay longer in the cooler.

The quantity of the cooling air corresponding to the demand of combustion air of the rotary kiln burner is continuously preset by the necessary fuel quantity. The distribution to the compartments 6, 7 is such that the mean pressures are equal. With a simplified control concept these pressures are kept constant by the action of the stop wall 8. The speed of the grate 3 is controlled by the temperature of the coarse material at the discharge 5 taken at the grate plates.

Alternatively, both the stop wall 8 and the grate 3 can operate in temperature control loops. In this case the total flow 11 is controlled by the pressure in one of the compartments 6, 7 preset by the necessary air quantity.

Feed variations are compensated by constant air quantities mantained by the fans 12, 13. If at low load the air quantity is not sufficient for partial fluidization, a portion of the air intake of compartment 6 is tapped from the cooler via a cyclone 14 and a booster fan 15, so that cooling corresponds to conditions under full load.

Compartment 7 is positioned ahead of the stop wall 8 in order to reduce air losses via the passage. A third compartment not shown is charged with some counterpressure in order to prevent air leakage via the grate. The air emerging into the cooler hood 16 is recycled by fan 13.

The front of the stop wall 8 exposed to heat radiation is protected by cast refractory and its foot is equipped with wear plates made of the same alloy as the grate plates.

The example given in FIG. 2 shows collecting points of the grate dribblings in each of the compartments 6, 7. The dribblings are recycled pneumatically at the pressure provided by the fans 12, 13 through pipes 18. A valve 19 throttles or operates intermittently.

What is claimed is:

1. A process of cooling a material bed of bulk material such as cement clinker, said process comprising the steps of
   (a) conveying said material bed on a grate cooler comprising a grate, a free end of high material temperature and a discharge end of a respectively lower material temperature in a conveying direction from said feed end towards said discharge end at a predetermined conveying rate,
   (b) cooling said material bed while conveying it with a cooling medium such as air,
   (c) pressurizing said cooling medium underneath said grate to an extent sufficient to penetrate said grate and said material bed in an upward direction and essentially perpendicular to said conveying direction, said cooling medium thus first cooling a bottom layer and then an upper layer of said material bed, and
   (d) decelerating said upper layer of said material bed with respect to said conveying rate of said grate.

2. A process according to claim 1, comprising the additional steps of
   (a) passing said cooling medium through said bottom layer and said upper layer of said material bed at a velocity sufficient to fluidize a fine size fraction of said bulk material, with said fine size fraction thus fluidized forming a fluidized bed and at least an essential part of said upper layer of said material bed, and said bottom layer forming a fixed bed comprising a coarse size fraction of said bulk material, and
   (b) decelerating said fluidized bed with respect to the conveying rate of said grate.

3. A process according to claim 1, wherein the average depth of said material bed composed by the partial depths of said bottom and upper layers is substantially higher than the normal depth of material beds of grate coolers.

4. A process according to claim 2, wherein the average depth of said material bed composed by the partial depths of said bottom and upper layers is substantially higher than the normal depth of material beds of grate coolers.

5. A process according to claim 2, wherein said material bed has a total depth composed by the partial depths of said fixed bed and said fluidized bed, which total depth increases from said feed end towards said discharge end, while said partial depth of said fluidized bed decreases from said feed end towards said discharge end.

6. A process according to any one of claims 1 or 2, comprising the steps of measuring the temperatures of said upper layer and said bottom layer separately and using said temperatures to control said conveying rate of said grate and said deceleration of said upper layer.

7. A process according to claim 2, comprising the steps of conveying said fluidized bed by gravity down a slope developing on top of said fluidized bed.

8. A process according to any one of claims 3 or 4, comprising the steps of collecting a portion of said material bed dribbling through said grate beneath said grate and recycling said collected portion onto the surface of said material bed pneumatically by means of said cooling medium.

9. A device for decelerating an upper layer of a material bed of bulk material such as cement clinker, which material bed is conveyed in a conveying direction on grate means defining a feed end and a discharge end, the temperature of said material decreasing from said feed end towards said discharge end by way of cooling said material by a cooling medium such as air which is pressurized to pass said material bed in a direction essentially perpendicular to said conveying direction from the underside of said grate means, said material bed and said grate means extending between lateral wall means essentially defining the width of said material bed, wherein said device comprises stop wall means extending between said lateral wall means and contacting said material bed from above at the region of said discharge end so as to leave a passage between said stop wall means and said grate means for discharging said material bed.

10. A device according to claim 9, wherein said passage is adjustable.

11. A device according to claim 9, wherein said passage is adjustable by hydraulic means comprising at least one hydraulic cylinder.

12. A device according to claim 11, wherein said hydraulic means comprise thrust limit detector means effecting said hydraulic means to briefly lift said stop wall and thereupon to lower it automatically.

13. A device according to claim 9, wherein said stop wall means are inclined from above towards said discharge end of said grate.

14. A device according to claim 9, wherein said stop wall means comprise a plurality of partitions over said lateral extension of said material bed.

15. A device according to claim 14, wherein said partitions are adjustable independent of each other.

16. A device according to claim 9, wherein said grate means comprise a reinforced part and wherein said stop wall means are arranged to act against said reinforced part to crush chunks which may be contained in said bulk material.

17. A device according to claim 9, comprising hopper means to collect any material dribbling through said grate, said hopper means including discharge spout means, wherein pipe means are arranged between said discharge spout means of said hopper means and said lateral wall means of said grate means and further comprising gate means or valves to shut off said pipes.

* * * * *